Figure 1:
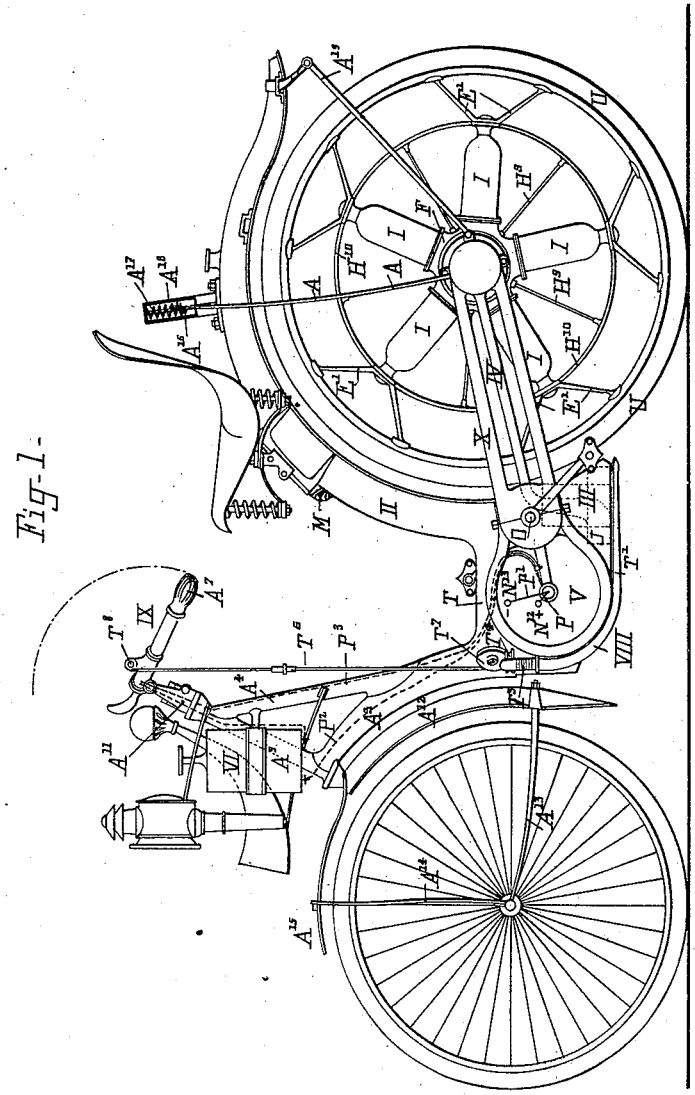

(No Model.)

9 Sheets—Sheet 1.

F. T. MILLET.
VELOCIPEDE.

No. 564,155.

Patented July 14, 1896.

(No Model.) 9 Sheets—Sheet 2.
F. T. MILLET.
VELOCIPEDE.
No. 564,155. Patented July 14, 1896.
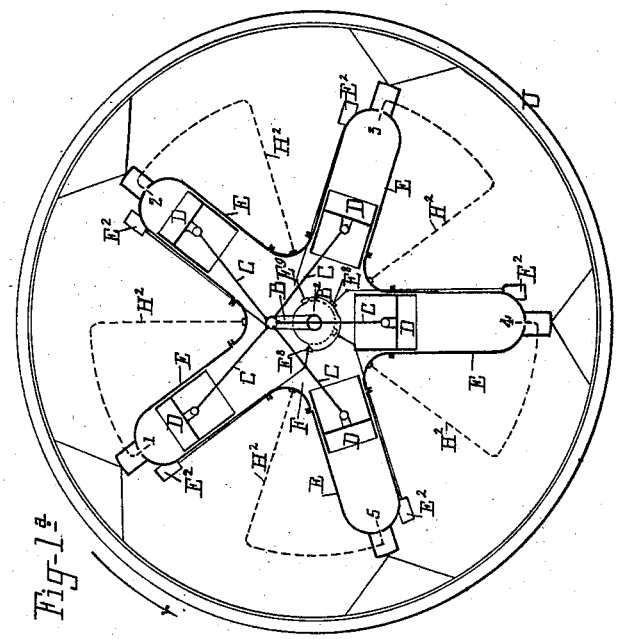
Fig-1ª
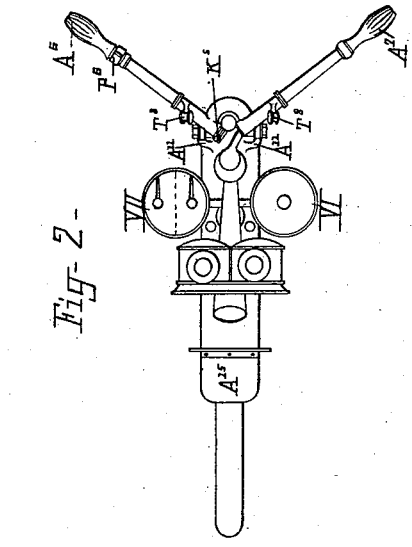
Fig-2
Witnesses
George Baumann
S. C. Connor
Inventor
Felix T. Millet
By his Attorneys
Howson & Howson (No Model.) 9 Sheets—Sheet 3.

F. T. MILLET.
VELOCIPEDE.

No. 564,155. Patented July 14, 1896.

Witnesses
George Baumann
S. C. Connor

Inventor
Felix T. Millet
By his Attorney
Howson & Howson (No Model.)  9 Sheets—Sheet 4.
F. T. MILLET.
VELOCIPEDE.
No. 564,155. Patented July 14, 1896.
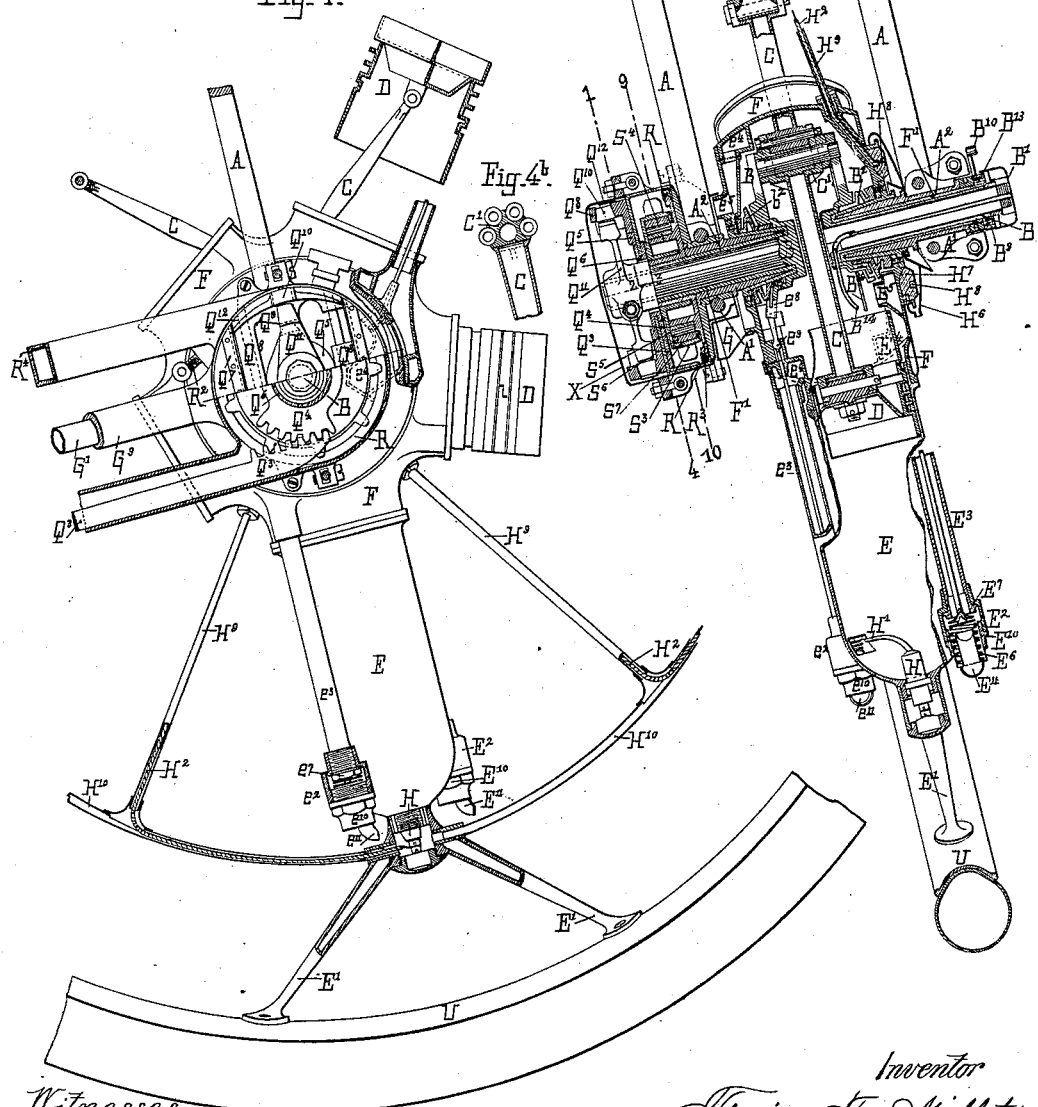
Witnesses
George Baumann
S. C. Connor
Inventor
Felix T. Millet
By his Attorneys
Howson & Howson (No Model.) 9 Sheets—Sheet 5.
F. T. MILLET.
VELOCIPEDE.
No. 564,155. Patented July 14, 1896.
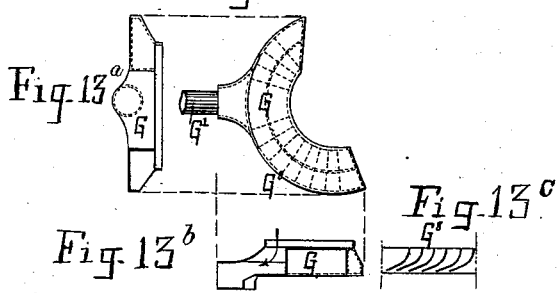
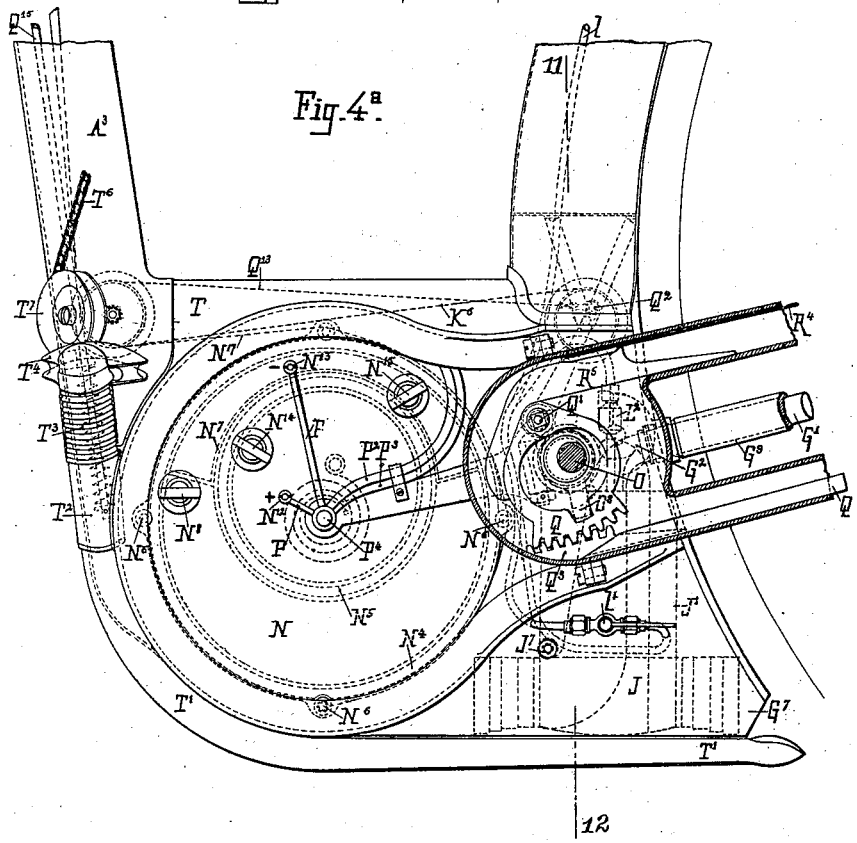
Witnesses
George Baumann
S. C. Connor
Inventor
Felix T. Millet
By his Attorneys
Howson & Howson (No Model.) 9 Sheets—Sheet 6.
F. T. MILLET.
VELOCIPEDE.
No. 564,155. Patented July 14, 1896.
Fig. 10.
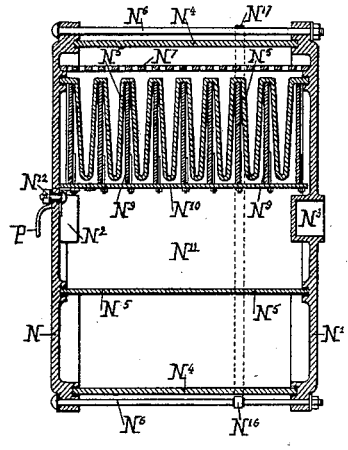
FIG. 5.ª
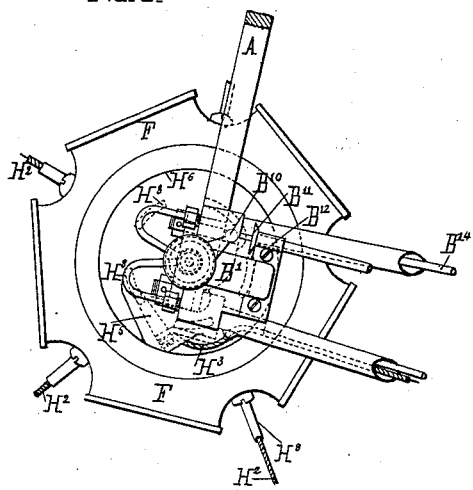
Fig. 9.
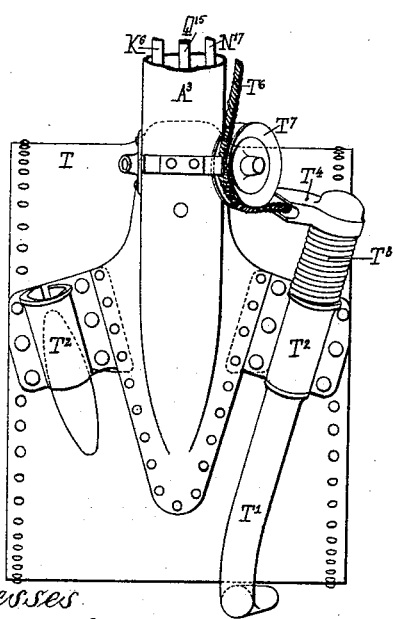
Fig. 11.
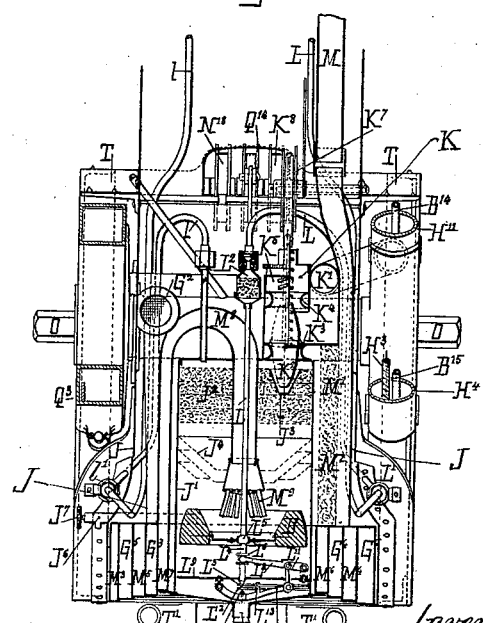
Witnesses
George Baumann
S. C. Connor
Inventor
Felix T. Millet
By his Attorneys
Howson & Howson (No Model.) 9 Sheets—Sheet 7.

F. T. MILLET.
VELOCIPEDE.

No. 564,155. Patented July 14, 1896.

Witnesses
George Baumann
S. C. Connor

Inventor
Felix T. Millett
By his Attorneys
Howson & Howson (No Model.) 9 Sheets—Sheet 8.

F. T. MILLET.
VELOCIPEDE.

No. 564,155. Patented July 14, 1896.

Witnesses
George Baumann
J. C. Connor

Inventor
Felix T. Millet
By his Attorneys
Howson & Howson

THE NORRIS PETERS CO., PHOTO-LITHO., WASHINGTON, D. C.

(No Model.) 9 Sheets—Sheet 9.
F. T. MILLET.
VELOCIPEDE.
No. 564,155. Patented July 14, 1896.
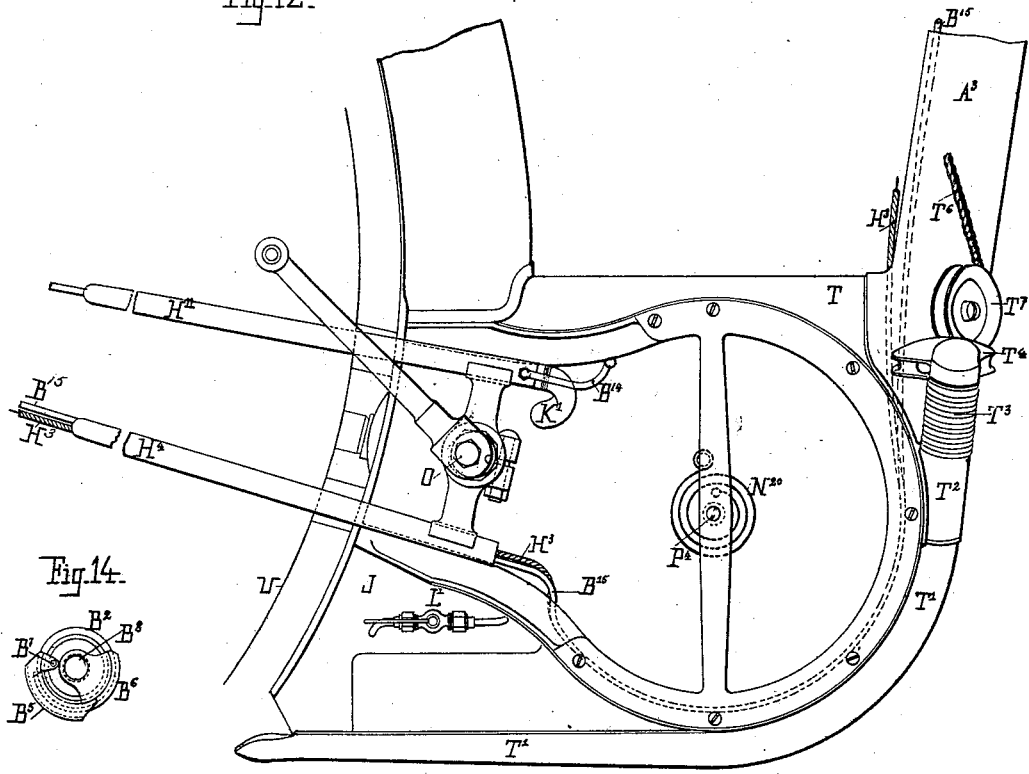
Fig. 12.
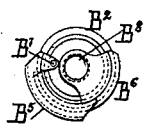
Fig. 14.
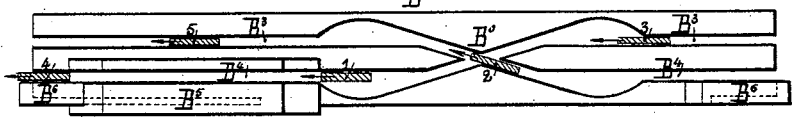
Fig. 14ª.
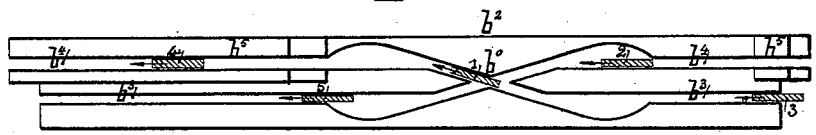
Fig. 15.
Witnesses
George Baumann
S. E. Connor
Inventor
Felix T. Millett
By his Attorneys
Howson & Howson

UNITED STATES PATENT OFFICE.

FELIX THÉODORE MILLET, OF PERSAN, FRANCE.

VELOCIPEDE.

SPECIFICATION forming part of Letters Patent No. 564,155, dated July 14, 1896.

Application filed March 25, 1895. Serial No. 543,077. (No model.) Patented in France December 22, 1888, No. 194,953, and February 22, 1894, No. 236,489; in Belgium March 18, 1889, No. 85,423, and in England March 26, 1889, No. 5,199.

*To all whom it may concern:*

Be it known that I, FELIX THÉODORE MILLET, a citizen of the Republic of France, residing in Persan, Department of Seine and Oise, France, have invented an Improved Motor-Vehicle, (for which I have obtained a French patent, No. 194,953, dated December 22, 1888, with three patents of addition, dated, respectively, December 16, 1889, December 24, 1891, and October 27, 1893; a French patent, No. 236,489, dated February 22, 1894; a Belgian patent, No. 85,423, dated March 18, 1889; a Belgian patent of addition, No. 99,193, dated April 12, 1892; and a British patent, No. 5,199, dated March 26, 1889,) of which the following is a specification.

This invention relates to various improvements in the construction of velocipedes; and it consists in particular in the arrangement of the driving-wheel, which carries its motor therein, and in other details of construction hereinafter described. The motor, which is combined with one of the wheels, by preference the rear wheel, of the cycle to be driven, is constructed with a series of cylinders, which are by preference of an odd number and are arranged radially and secured at their inner ends round a central hollow box, which forms the nave of the wheel, and at their outer ends to the felly of the wheel. The pistons of the cylinders are connected by rods to a bent spindle or crank-shaft, which is always keyed to the frame of the vehicle when the motor is in operation. Thus under ordinary conditions the shaft is fixed and the cylinders, as well as their pistons, turn on the latter and engage the felly or rim of the wheel. The crank of the bent shaft, as well as the piston-rods, are housed in the central box, which forms the nave of the wheel. Among the advantages presented by this arrangement may be mentioned the automatic cooling of the cylinders by reason of their rapid motion through the air, and also reducing or diminishing the transmission by dispensing with the transmission-gear between the wheel and the said motor, the two latter forming a single rigid part, and since all the operating mechanism (the crank, rods, and pistons) are placed in the closed portion formed by the nave of the wheel and the cylinders the said mechanism is very efficiently protected from the dust and the parts which form it are automatically lubricated. An explosion-engine is preferably employed, operated by petroleum or other explosive fluid. Each of the cylinders constituting the said motor is single-acting and working on the four-cycle principle, that is to say, in stages of suction, compression, explosion, and exhaustion. The complete cycle of work of each cylinder takes place during two turns of the wheel, and in order that the phases may follow in regular succession in the different cylinders it is preferred that their number be uneven. Take, for example, five cylinders and suppose them to be numbered 1 2 3 4 5. The explosions will follow in regular succession in every second cylinder in the order 1 3 5 2 4 and constitute the useful phases when working on the four-cycle principle and are the sole means for producing the motive power. In like manner the other phases can also succeed each other, respectively, in the same order. To effect this, the supply and exhaust valves of each cylinder are operated, respectively, by a double-faced or two-way cam, which only opens the corresponding valve for supply or exhaust of each cylinder once for every two revolutions of the motor.

Any other number of cylinders than five may be employed. For instance, three may be used, but in this case difficulties would occur for overcoming the dead-point at starting. In the case where seven cylinders are employed the dead-point would be more readily passed than with five cylinders; but as lightness is desirable in this class of vehicle I prefer to adopt five cylinders.

The combustion of the explosive mixture in the cylinders can be obtained in any suitable manner, for instance, by means of a battery combined with an induction-coil or by accumulators, or by a dynamo operated by the motor-wheel itself, or by a flame, or by an incandescent tube.

My invention also relates to the grouping together of the parts adjoining the motor, for instance, the carbureter, the engaging and disconnecting mechanism for the motor, the battery, the pedals, the endless chain, the brakes, &c., in that part occupied in ordinary cycles by the chain and the two toothed wheels, and in the arrangement of the hydrocarbon-reservoir in the form of a mud-guard for one of the wheels, so as to occupy the smallest space possible and facilitate the operation of the various parts.

The method of connecting the pedal-axle to the nave of the motor-wheel also forms part of this invention. The connection adopted permits the motor-wheel when desirable to be driven by the pedals and endless chain, as has been customary hitherto, but the connections are so arranged that the pedal-axle is not driven by the motor-wheel when the motor itself is in use.

In order that my said invention may be fully understood, I shall now proceed more particularly to describe the same, and for that purpose shall refer to the several figures on the annexed sheets of drawings, the same letters and numerals of reference indicating corresponding parts in all the figures.

Figure 16:
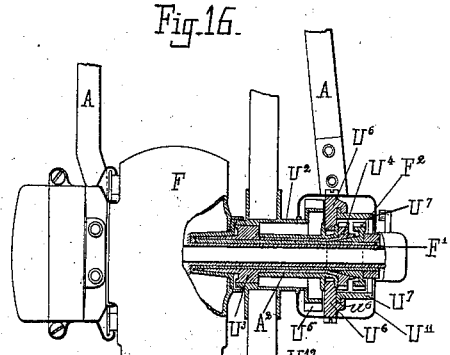
Figure 17:
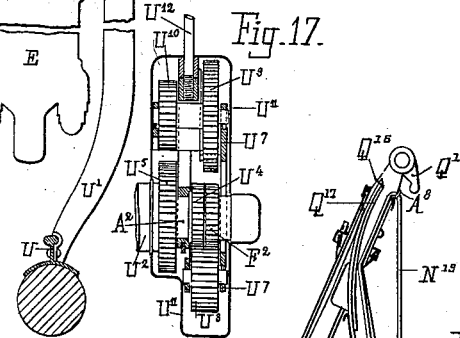
Figure 3:
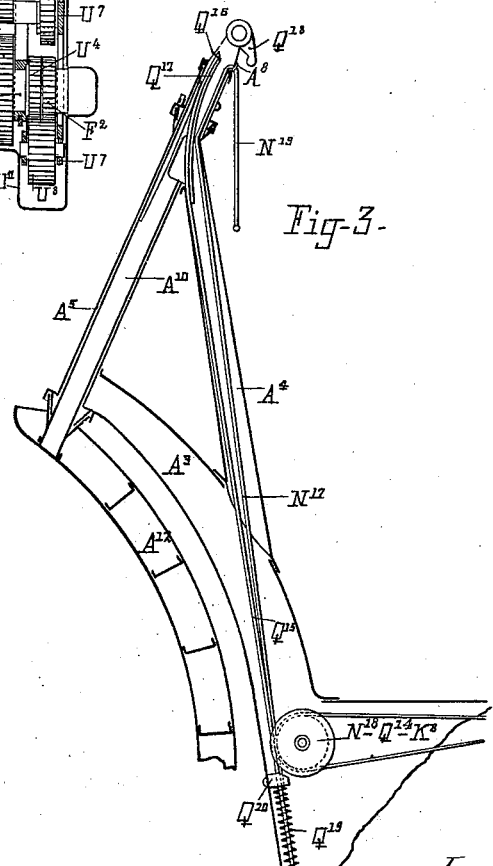
Figure 6:
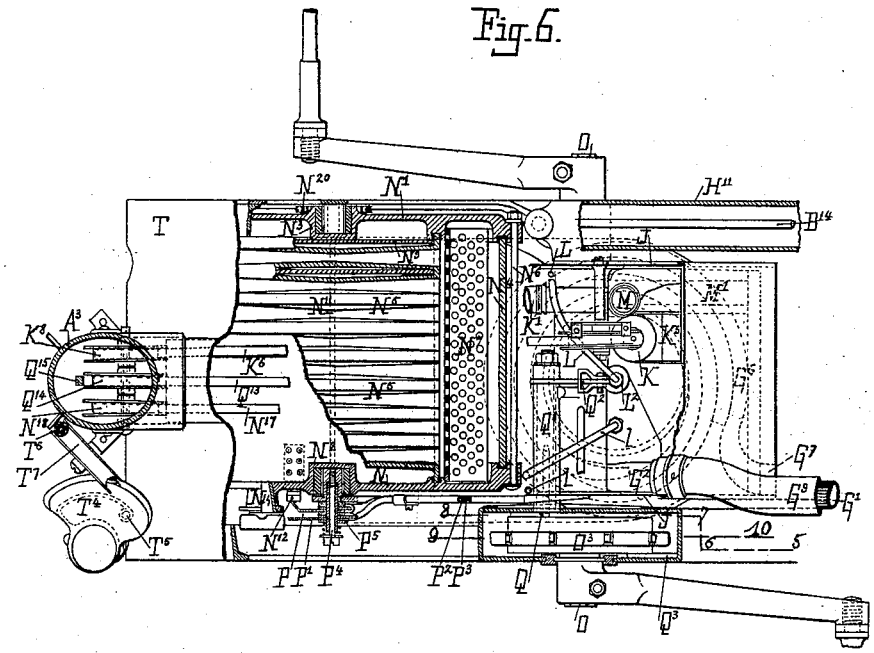
Figure 8:
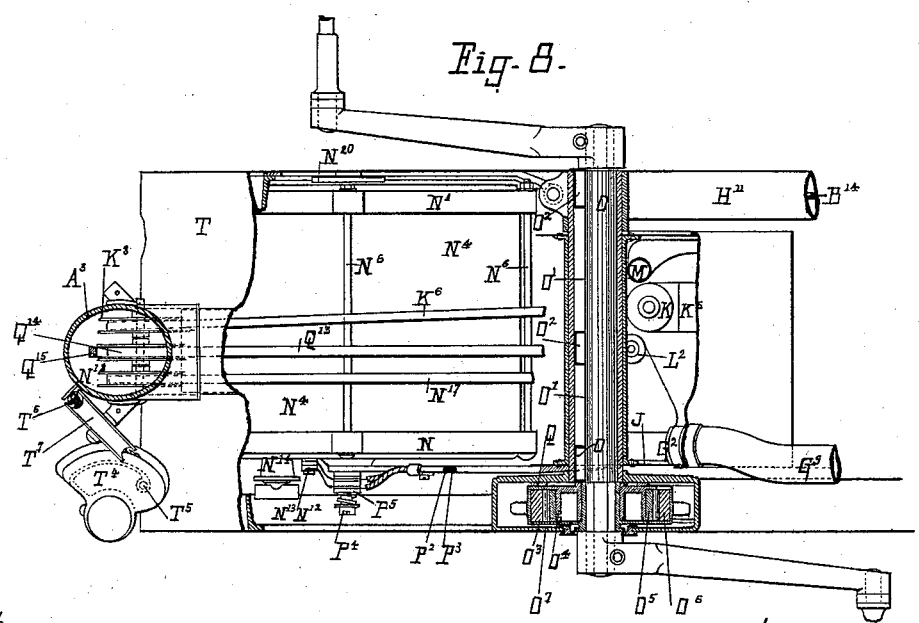
Figure 7:
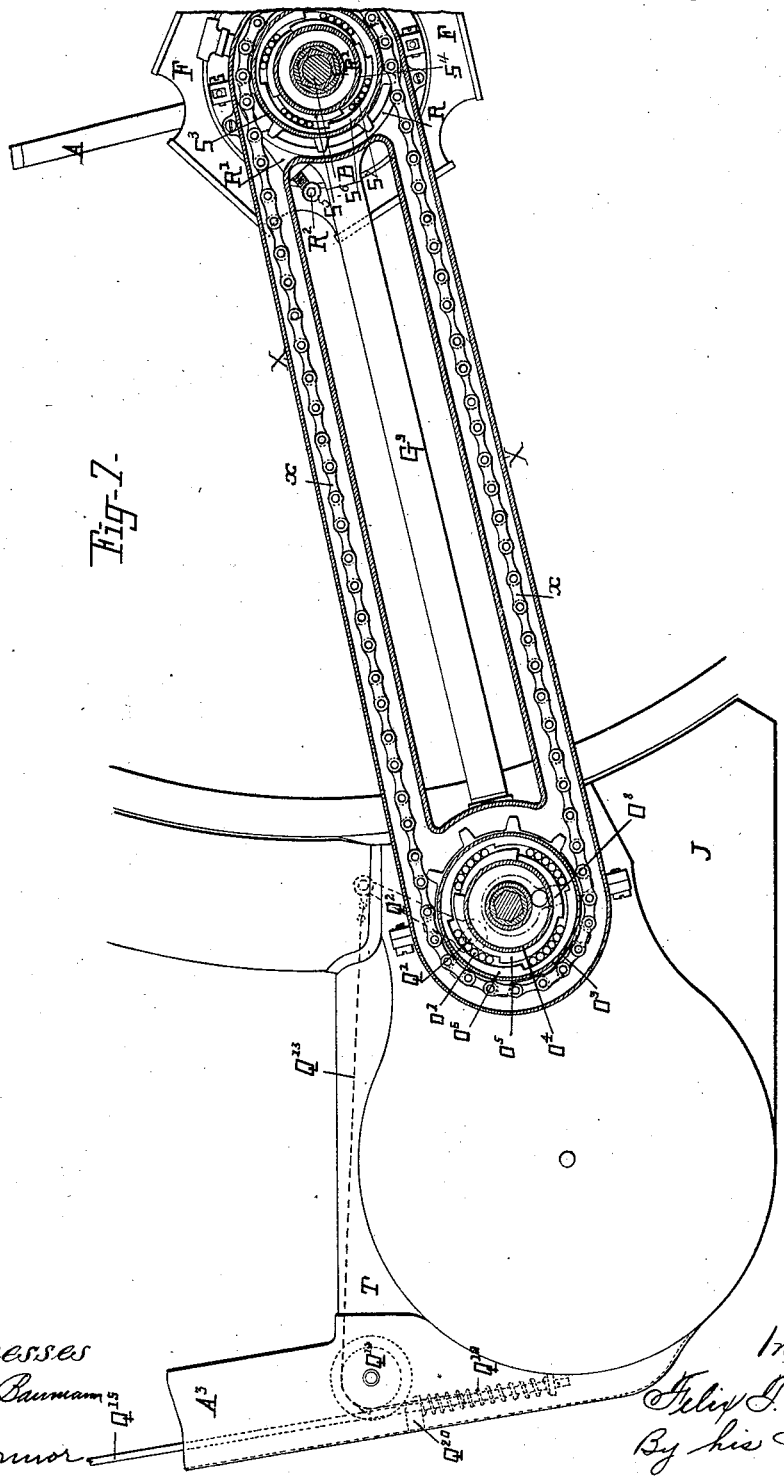

Figure 1 shows in elevation a general view of a bicycle constructed according to this invention. Fig. 1$^a$ shows, diagrammatically, a vertical section of the motor, demonstrating the operation thereof. Fig. 2 is a plan of the front portion of the said bicycle. Fig. 3 shows in vertical section, drawn to a larger scale, the front portion of the frame of the bicycle. Fig. 4 is a longitudinal vertical section taken through the endless-chain box along the line 1 2 3 4, Fig. 5, with parts removed for showing certain details contained within. Fig. 4$^a$ is a vertical longitudinal section passing through the endless-chain box and forming a continuation of the section shown in Fig. 4 deviating from the line 5 6 7 8, Fig. 6. Fig. 4$^b$ is a transverse section of the hinged head of the piston-rod. Fig. 5 is a transverse vertical section taken through the axis of the motor-wheel. Fig. 5$^a$ is an external view on the right side of part of the machine around the axis of the motor-wheel. Fig. 6 is a plan corresponding to Fig. 4$^a$ with certain parts removed, so as to allow details of construction within to be seen. Fig. 7 is a vertical longitudinal section of the endless-chain box, taken through the plane 9 and 10, Figs. 5 and 6, that is to say, vertically through the two toothed wheels of the endless chain. Fig. 8 shows in sectional plan the mechanism of the pedal-shaft with certain parts removed for permitting the adjoining casing to be seen in elevation. Fig. 9 is a front elevation of the fore part of the vessel containing the battery and carbureter. Fig. 10 is a vertical section of the battery removed from its casing. Fig. 11 is a vertical section of the carbureter, taken along the line 11 12, Fig. 4$^a$. Fig. 12 is an external view on the right side showing, in elevation, part of the frame contained between the axis of the pedals and the axis of the motor-wheel. Fig. 13 shows in side elevation, Fig. 13$^a$ in end elevation, Fig. 13$^b$ in plan, and Fig. 13$^c$ in vertical section, the collector for the gas escaping from the motor-cylinders. Fig. 14 shows the distributing-cam corresponding to the supply-valve in a front view and transverse section. Fig. 14$^a$ shows the development of the said admission-cam, in the grooves of which are shown the sliding box operating the supply-valve. Fig. 15 shows an analogous development of the exhaust-cam. Fig. 16 is an elevation, partly in section, of a modification of self-operating wheel with means for changing speed; and Fig. 17 is a corresponding horizontal section taken through the axis of the said wheel.

The same letters and numerals of reference indicate corresponding parts in all the figures.

A velocipede constructed according to my invention contains, in general, the following parts, as seen in Fig. 1: A motor I, consisting of a series of cylinders mounted in the rear wheel radially around the axis of the said wheel and fed with atmospheric air charged with combustible vapor to render it explosive; a reservoir II for petroleum, gasolene, or other hydrocarbon, constituting the mud-guard and storing a certain quantity of the liquid which generates the combustible vapor; a carbureter III for vaporizing the said liquid and effecting its mixture with the atmospheric air. The combustible mixture of vapor after having been used in the said motor is driven therefrom into a collector IV, connecting the discharge from the motor to the carbureter III, where the exhaust-gases impart heat to the air which forms the explosive mixture.

In front of the carbureter III is arranged a reversing-battery V, having its connections attached to the terminals of the circuit of an electric transformer or induction-coil VI. The circuit induced from this coil is connected on the one hand to the end of each cylinder and on the other hand to the frame of the cycle which constitutes the return-conductor. This battery and transformer are dispensed with when another means for effecting ignition is employed and may be replaced by equivalent means, for instance, by a dynamo or incandescent tubes.

The cycle also carries certain accessory apparatus, such as a reservoir VII, Fig. 2, divided into two compartments by a vertical partition and containing in the one the oil for effecting the lubrication of the motor and in the other petroleum or the like for increasing when desired the carburization of the explosive mixture in the motor, a parachute VIII for retaining the bicycle in a vertical position when stationary, operated by the steering-handles IX, a box X, inclosing the toothed wheels, endless chain, and the brake mechanism, and means for engaging the crank-shaft of the motor, and finally the different transmitting and connecting mechanisms for connecting up the different parts of the cycle.

I will now describe these different apparatus and parts in succession as well as their operation.

The motor which is mounted in the rear wheel of the cycle of which it forms part is shown in detail in Figs. 4 and 5 of the accompanying drawings.

In the rear fork A of the frame of the machine, in the ends of which are locking-collars A' where the fixed sleeves A² are secured, is mounted a crank-shaft B, which is made fast with the said fork when the motor is in operation. This locking of the crank-shaft B on the fork A is effected by means of an arrangement hereinafter described. At present we will suppose this crank-shaft to be fixed. On the said crank-shaft are jointed the piston-rods in the following manner: One of the rods C ends in a forked sleeve C', between the forks of which the rods of the piston are jointed, Figs. $4^b$ and 5. The rods are connected at their other ends to the pistons D, moving in the cylinders E. The said cylinders are screwed into a series of junction-pieces formed on the hollow nave F, which contains the explosive mixture which is drawn in succession into the different cylinders. The cylinders are secured at their other extremities to the felly of the wheel by base-plates E', Figs. 4 and 5, or by any other suitable means. The nave F is secured on both sides to two hollow trunnions F', loose on the crank-shaft B.

The right side of the crank-shaft B is hollow and opens into a box B', into which the explosive mixture formed in the carbureter arrives. The mixture passes into the nave F and thence is distributed to the cylinders in succession. For effecting this each of the cylinders is provided with a supply or feed valve $E^2$, formed in a tube $E^3$, one end of which tube opens into a chamber $E^4$, which communicates by the orifice $E^5$ with the interior of the nave F.

The supply-valve is controlled by a spiral metallic spring $E^6$, which tends to keep it constantly against its seat $E^7$. In order to keep the spring $E^6$ cool, which becomes heated owing to the explosions which take place, a hollow plug $E^{10}$ is provided, closing the valve-chamber and having at its center a spoon-shaped part or scoop $E^{11}$, which collects the air during rotation and so keeps the spring cool. A two-way cam $B^2$ is provided for opening the valve at the desired time. The arrangement of the said valve will be hereinafter described with reference to Figs. 14 and $14^a$. The rod of the valve $E^2$ is connected at its inner end by a ball-and-socket joint $E^9$ to a sliding piece $E^8$, which follows the path of the cam when the motor rotates, Fig. $1^a$.

The exhaust-valve $e^2$, which is formed in precisely the same manner as the admission-valve, communicates by a tube $e^3$ with a chamber $e^4$, Fig. 5, formed in the hub, but whose orifice $e^5$, instead of opening into the said hub, as the orifice $E^5$ of the chamber $E^4$ on the admission side of the apparatus, opens on the outer side into a gas-collector G, Fig. 5, and shown separately in Fig. 13 and numbered IV in the general elevation of the apparatus, as seen in Fig. 1. The rod of the valve $e^2$ is connected to the cam $b^2$ in a similar manner to that described for the admission-valve, namely, by means of a sliding block $e^8$, Fig. 5, jointed to the rod at $e^9$, which is caused to bear against the cam by a spring $e^6$, situated beneath the valve.

The cams for operating the supply and exhaust valves are constructed in the following manner, with reference more particularly to Figs. 1, 14, and $14^a$: Each of the cams is formed by a ring or hoop made from a single piece or several pieces collected together, in the circumference of each of which two grooves $b^3$ $b^4$ $B^3$ $B^4$ are formed, the said grooves intersecting in each cam at the point $b^0$ $B^0$ and being widened on both sides of this point of intersection to allow of the sliding block following the curves at this point. Since, as has already been stated, each cylinder is only opened once for admission and once for exhaust during two revolutions of the motor, the sides of one of the grooves $b^3$ $B^3$ of each cam must be of a uniform height, so that the sliding parts $e^8$ $E^8$ be not diverted from the axis of the cam during one revolution of the motor, while the sides of the other grooves $b^4$ $B^4$ should be provided with a rising part or projection $b^5$ $B^5$ for diverting the said sliding blocks $e^8$ $E^8$ from the axis of the cam, so as to cause the opening of the corresponding valve $e^2$ $E^2$ at the moment of escape and admission. As in the exhaust-valve the duration of the opening of the valve is always the same, no further description of the cam operating the said exhaust-valve is required.

With respect to the supply-valve the duration of the opening of the said valve has to be prolonged in certain cases beyond the period of admission, that is to say, during the beginning of the compression, as will be explained hereinafter. To effect this, the projecting part $B^5$ of the admission-cam $B^2$ is formed separate from the cam proper, except at a point of junction $B^7$, so as to form between the said projecting part $B^5$ and the said cam $B^2$ a space in which a sector $B^6$ can slide at an angle, moving round the axis of the cam, and which corresponds in transverse section to the said space. The sector $B^6$ may be entirely hidden beneath the projection $B^5$ in the case when the admission-valve is to be opened for its normal time—that is to say, its shortest duration. When, on the other hand, it is desired to prolong the period of admission of the said valve, the sector $B^6$ is caused to project in a varying degree, as may be desired, from its normal position which it occupies beneath the projecting part $B^5$, and so to increase the length of the projecting piece, which regulates the opening of the valve. The movement of this sector is obtained in the following manner: The sector $B^6$ is fixed on the inner end of a tube $B^8$, Figs. 5 and 14, which is arranged within the right portion of the hollow crank-shaft B. The said tube is made fast at its other end with a box $B^9$, provided with a lever $B^{10}$, Figs. 5 and $5^a$, which may be operated in any suitable manner by transmission gear, cords, and levers starting from the steering-handles IX and terminating in a sliding thrust-piece $B^{11}$, guided in a sleeve $B^{12}$, which can be forced against the end of the said lever $B^{10}$, which will turn and engage the box $B^9$. A spiral spring $B^{13}$, Fig. 5, having one of its ends secured to the box $B^9$ and its other end fixed to the hollow part of the crank-shaft B, serves to automatically bring back the sector $B^6$ beneath the projecting part $B^5$ when the action of the thrust-piece $B^{11}$ against the lever $B^{10}$ has ceased.

To increase the carburization of the explosive mixture, when desired, when it has entered the hollow nave F, a pipe $B^{14}$ is provided from one of the compartments of the reservoir VII, Fig. 2, hereinbefore described, which descends along the frame of the machine, and enters near the pedal-axle into the upper conduit $H^{11}$ of the right portion of the frame, Fig. 12, keeping in this conduit to the nave, where the said tube is curved, and passing through the hub-box $B'$ is continued to the inside of the hollow crank-shaft B, Figs. 5 and $5^a$, along its axis, and finally ends in a downwardly-bent part. By this means the petroleum contained in any of the compartments of the reservoir VII can be supplied in the smallest quantities to the interior of the nave F when it is desired to increase the carburization of the explosive mixture.

The lubrication of the inner parts of the mechanism is effected by means of oil contained in the other compartment of the reservoir VII, from which a pipe $B^{15}$ descends in a similar manner to the pipe $B^{14}$, just described, along the frame of the machine, through the lower conduit $H^4$ of the right portion of the frame, Fig. 12, and so to the nave, where the said pipe is bent at its entry into the hub-box $B'$. The gases forming the explosive mixture passing through this box draw the oil into the hollow part of the crank-shaft and thence to all parts of the motor. A thin disk $B^{16}$, Fig. 5, of aluminium or other metal carried on the crank-shaft B within the nave F protects the orifice $E^5$ from the fluid coming from the hollow portion of the crank-shaft B.

To obtain the ignition of the explosive mixture in each cylinder at the proper time, the cylinders are provided at their outer ends with semispherical terminals H of porcelain or other insulating material, through each of which passes a curved metallic piece $H'$, Fig. 5, provided at one end with a piece of platinum and at its other end connected by means of screws to a conductor $H^2$, Fig. 4, which is connected to an induction-coil VI in the following manner: To one of the terminals of the circuit formed by this coil is connected a conducting-wire $H^3$, which passes down the frame of the machine, entering the lower conduit $H^4$ near the pedal-axle, Fig. 12, and passing through this conduit to the nave, Fig. $5^a$, abuts against a flexible plate $H^5$, which is fixed to the interior of a circular box or shield $H^6$, protecting the electrical contacts, the said box being carried on the fixed sleeve $A^2$, and so stationary. (See Fig. 5.) Opposite this flexible contact $H^5$ a disk $H^7$ of insulating material is arranged, carried by the right hollow trunnion $F'$ of the nave F. Embedded in the disk are five metallic segments $H^8$ and in electrical contact with five corresponding conducting-wires $H^2$, one for each segment, and leaving the nave radially by pipes $H^9$, which are connected to each other by a circular pipe $H^{10}$, Fig. 4, into which each of the conducting-wires after passing through its tube $H^9$ is bent laterally and passes along through, say, a tenth part of its circumference, and is finally connected up to the contact-piece $H'$ in its cylinder.

Since the flexible contact $H^5$ is in a fixed position and the segmental disk $H^7$ turns with the nave, the contact $H'$ of each cylinder will come into successive electrical contact with the induction-bobbin VI by reason of the succession of contacts between the spring $H^5$ and each of the segments $H^8$. Since the other terminal of the conductor from the coil VI is in communication with the metal frame of the machine, the electric spark for ignition can be obtained at the contact $H'$ when desired.

The operation of the motor will now be described with reference to Figs. $1^a$, 4, 5, 14, $14^a$, and 15. The complete cycle of any cylinder of this motor is accomplished, as has already been stated, in four strokes, drawing in the charge, compression, ignition, and exhaust from the cylinder taking place during two revolutions of the wheel.

I will now suppose a motor to be provided with five cylinders numbered 1 2 3 4 5 and turning in the direction of the arrow, Fig. $1^a$. The following are the phases through which the cylinder 1 will pass in two revolutions of the wheel: In the first position (shown in Fig. $1^a$) the cylinder 1 commences to draw in the explosive mixture—that is to say, the sliding block $E^8$, corresponding to the admission-valve $E^2$, begins to climb the projection $B^5$ of the cam $B^2$, so as to raise the said valve from its seat, compressing the spring $E^6$. The admission of the charge continues until the cylinder reaches the lowest position, (shown at 4, Fig. $1^a$,) when under normal conditions compression should commence; but if it has been found necessary to bring forward the sector $B^6$ in a line with the projection $B^5$ the admission-valve will remain open for a certain fraction of the piston's stroke toward the end of the cylinder, and during this time the piston will cause a portion of the explosive mixture to flow back into the nave F, where it will again be supplied to the next cylinder opening for supply. At a place varying with the length of the uncovered portion of the sector $B^6$ the slide-block of the cylinder 1 under consideration will fall onto the lower portion of the cam and the supply will be cut off. The second phase, the compression of the charge, will then take place and be continued until the cylinder reaches its highest position, the cylinder 1 having thus accomplished in its first revolution the two phases of supply and compression. At the commencement of the second revolution—that is to say, when the cylinder has returned to approximately the position 1, as shown in Fig. 1ª—the segment $H^8$, corresponding to the said cylinder, comes in contact with the flexible strip or blade $H^5$ and a spark is produced in the cylinder. The explosive mixture thus ignited expands to a high degree and thrusts the piston toward the nave, this third movement being the sole one producing actual motion. When the piston arrives near the nave—that is to say, when it has reached the lower position 4, Fig. 1ª—the block $e^8$, corresponding to the exhaust-valve $e^2$, commences to climb the projecting part $b^5$ of the exhaust-cam $b^2$, so as to open the said valve, the products of combustion expand and escape, and any remaining in the cylinder are driven out by the piston returning to the end thereof. The cylinder 1 thus again reaches its highest position and the fourth movement—that is to say, the exhaustion of the cylinder—has been accomplished. The gases so exhausted pass through the tube $e^3$ into the chamber $e^4$ and escape by the orifice $e^5$ into the collector IV to the carbureter, where they are employed for heating the air to be carbureted. A fresh ignition now takes place at the bottom of the cylinder, owing to the corresponding segment $H^8$ coming in contact with the flexible blade $H^5$ once for each revolution and invariably at the same spot; but in this case the ignition is produced in a mixture of consumed gases which are noninflammable, since the opening of the admission-valve, and consequently the supply of explosive mixture in the cylinder, does not take place until after the said ignition or spark has been produced. The blocks $E^8 e^8$ are arranged alternately on each of the grooves of their respective cams, Figs. 14ª and 15. In the position shown in Figs. 1ª, 4, and 5 the blocks of the cylinders 1 4 2 are in the projecting groove $B^4$ of the admission-cam, Fig. 14ª, the cylinder 1 being at the commencement of the supply-stroke, the cylinder 4 at the end of the same stroke, and the cylinder 2 being in the stage of compression. The blocks 5 and 3 are, on the other hand, in the uniform or even groove $B^3$ of the admission-cam, the cylinder 5 being at the explosion stage and the cylinder 3 at the exhaust stage. During the rotation of the motor the first block to reach the point of intersection $B^0$ on the cam-paths is the block of the cylinder 2, and the compression is completed on passing this point $B^0$. The block then passes from the groove $B^4$ to the even groove $B^5$, in which it is found during the phases of ignition and discharge. The block of the cylinder 3 is the next to pass the intersecting part $B^0$. This takes place at the discharge stage and in an inverse direction to the preceding block, since it moves from the groove $B^3$ to the groove $B^4$, the cylinder then passing from the stage of exhaustion to that of supply, and so on. In the case of the discharge-cam, as in the position shown in Fig. 1ª, the blocks of the cylinders 1, 4, and 2 are in the even groove $b^3$, Fig. 15, as the exhaust-valve must not be open in the phases which the cylinders are completing. On the other hand, the blocks of the cylinders 5 and 3 are in the projecting part $b^4$ of the groove, the cylinder 3 being at the exhaust stage and the cylinder 5 just reaching it. The travel of the blocks from one groove to another takes place at the point $b^0$, and the first block to arrive there will be 2, which will pass from the groove $b^3$ to the groove $b^4$. Then the block 3 will follow in the opposite direction, and so on.

When the motor has been heated by reason of several explosions having taken place in each cylinder, the carburization of the air passing from the carbureter to the box B' and the hollow part of the crank-shaft B may be diminished more or less or entirely stopped. To effect this, the carburization of the air in the nave itself may be increased by allowing petroleum to flow in a greater or less amount by the pipe $B^4$, as has already been explained.

The mixture of gas and air for making the explosion in the different cylinders of the motor may be obtained by making use of a carbureter of any desired construction placed in a suitable position on the bicycle. At the same time I give preference to a carbureter of the following description, marked III in Fig. 1 and situated immediately beneath the axis of the pedal.

The carbureter consists of a cylindrical casing J, Figs. 11, 4ª, and 6, or may be of any other shape. In the interior of the casing an air-tight chamber J' is arranged, in which atmospheric air previously heated is charged with combustible vapors by contact with hydrocarbon, as hereinafter explained. The hydrocarbon, which is stored in a reservoir II, Fig. 1, forming the mud-guard for the rear wheel, leads to the carbureter from the base of the reservoir II by a pipe L, which is soldered on the right of the carbureter to a stopcock L'. From this point the pipe L ascends the inside of the carbureter to the upper part, where it is bent at right angles, and descends again in the center thereof, so as to open into the base of the box J'. A cotton filter $L^2$ is placed in the tube L to prevent dust or other matter descending the said tube to the lower obturator or plug $L^3$, hereinafter referred to. The hydrocarbon being fed in by this pipe is regulated by means of an automatic device hereinafter described. Besides the liquid hydrocarbon the hydrocarbon vapors which collect at the upper part of the mud-guard reservoir II are conducted to the box J' of the carbureter by a pipe $l$ from the top of the said reservoir II, and which is joined to the left of the carbureter to a stop-cock $l'$, arranged symmetrically opposite $L'$. From the cock $l'$ the pipe $l$ is led up the inside of the carbureter toward the upper part, where it is bent around again, so as to descend and open into the top of the box $J'$.

The box $J'$, in which the carburization of the atmospheric air which has been previously heated takes place, is surrounded toward its lower end by a double spiral chamber, in one spiral of which the air to be carbureted circulates, while through the other the exhaust gases coming from the motor by the collector IV pass. The spiral for the air $M^3$ $M^4$ $M^5$ $M^6$ $M^7$ is in communication at the end $M^3$ farthest from the axis of the carbureter with a box $M'$, fed with atmospheric air by a pipe $M$, which terminates in bell-mouth at its upper part beneath the saddle, Fig. 1. In the box $M'$ is a thick cotton filter $M^2$, held between two metallic plates, and through which the air is compelled to pass before entering the spiral. The inner end of the said spiral $M^7$ is continued into a pipe $M^8$, rising into the carbureter, and which is curved back again in gooseneck shape, so as to descend into the center of the box $J'$, where it ends in a number of small distributing-tubes $M^9$, flush or thereabout with the hydrocarbon in the said box. The second spiral $G^3$ $G^4$ $G^5$ $G^6$ $G^7$ communicates at its inner end with a vertical tube $G^2$, upwardly increasing in cross-section and connected with the conduit $G'$, Figs. 4$^a$ and 11, leading from the half-ring $G$ of the exhaust-gas collector. The other end of the said spiral is open to the air.

The collector, Figs. 13, 13$^a$, 13$^b$, and 13$^c$, is arranged to the left on the crank-shaft of the motor and directly against the nave, and is formed in a half-ring open to the exhaust-orifices $e^5$ of the motor, Fig. 5, and furnished with wings or blades $G^8$, similar to those employed for turbines and converging toward the pipe $G'$, which forms an extension of the said ring. The gases escaping from the orifices $e^5$ are collected by the said blades into the pipe $G'$, which is protected from the radiation of heat by the casing $G^9$ and passed by the pipe $G^2$ into the spiral $G^3$ $G^7$, Fig. 11, so as to impart their heat in their passage to the air circulating in an opposite direction in the aforesaid spiral $M^3$ $M^7$, these gases finally escaping into the open air by the end $G^7$ of this spiral.

The box $M'$, which is fed directly with atmospheric air by the pipe $M$, communicates at its upper end through a conduit $K^5$ with a box $K$ and double cone-valve $K^2$, which, in its turn, communicates by the pipe $K'$ with the conduit $H''$, situated on the upper right portion of the frame, as shown in Fig. 12, and which serves to conduct the explosive mixture to the box $B'$ and thence to the nave of the driving-wheel or motor. The box $K$ is also in communication by the passage $K^3$ with the carbureting-chamber $J'$, the valve $K^2$ of which may be retained at will on its lower seat formed at the opening of the passage $K^3$ into the carbureting-chamber, or on its upper seat $K^4$, formed against the opening between the box $K$ and the box $M'$. According as the aforesaid valve is on its lower or upper seat the conduit $H''$ communicates by the box $K$ either directly with the box $M'$ or with the carbureting-chamber $J'$. In the position of the valve $K^2$ as shown in Fig. 11 the motor will only be fed with pure atmospheric air, which is drawn in by the pipe $H''$ and union $K'$ to the box $K$, which communicates by the conduit $K^5$ with the box $M'$, forming a continuation of the air-supply pipe $M$. When the valve $K^2$ is raised from its lower seat to cause it to bear against its upper seat, a feed takes place by the orifice $K^3$ into the carbureting-chamber $J'$. The air reaching the box $M'$ by the pipe $M$ can no longer pass direct into the box $K$, as the conduit $K^4$ is closed, but passes to the carbureting-chamber $J'$ by the spiral $M^3$ $M^7$ and the feed-pipe $M^8$. The air heated and carbureted during its progress then passes from the carbureting-chamber $J'$ into the box $K$ and thence to the motor by the union $K'$ and pipe $H''$, as has already been described. The degree of carburization of the air going to the motor may be regulated according to the position the double conical valve $K^2$ is caused to assume between its two extreme positions. The said valve may be operated in any suitable manner, for instance, by the construction shown in Figs. 11, 4$^a$, 6, and 8. The valve $K^2$ is suspended by a cord $K^6$, passing over two guide-pulleys $K^7$ $K^8$, Figs. 3, 4$^a$, 6, 8, and 11, and then rises vertically to the inside of the goosenecked part of the machine $A^3$ and of the supporting-strut $A^4$, Fig. 3, of the fore part of the machine, and at its upper end is attached to the end of the right handle $A^6$ of the steering-head IX, on which it can be wound, and so for regulating the position of the valve $K^2$ it is merely necessary to wind or unwind the cord on the handle.

We have already stated that the petroleum reaches the carburization-chamber by the feed-pipe $L$, Fig. 11. At the lower end of this pipe is a regulating device for obtaining a constant level of the petroleum in the carbureting-chamber $J'$ under the tubes $M^9$, situated at the lower end of the pipe $M^8$, which supplies the air to the said chamber. This is arranged to take place by means of the following apparatus: Around the base of the petroleum-feed pipe $L$ is a cylindrical connection $L^4$, terminating in a spherical part $L^5$ at its upper end and in two cheeks $L^6$ at its lower end. An annular float $L^7$ is connected centrally to the spherical part by arms. Between the cheeks $L^6$ of the movable connecting-piece $L^4$ are the ends of a forked lever $L^8$, jointed at its other end to a plate $L^9$, secured to the petroleum-feed tube $L$. On the under surface of the said plate is jointed another lever $L^{10}$, whose free end is connected by a rod $L''$ to a point on the first-named lever $L^8$. On the under side of the said plate a flexible blade $L^3$ is also fixed, serving as an obturator or plug for the lower orifice of the tube L, and beneath the said obturator a second flexible blade $L^{12}$, on which a hook $L^{13}$, formed in one with the lever $L^{10}$, takes. The last-named lever also carries beneath the orifice of the tube L a nipple $L^{14}$, which bears on the blade $L^{12}$, situated immediately above it.

The above-named parts operate in the following manner: Under ordinary circumstances the inner orifice of the tube L is closed by the flexible plug $L^3$ under the action of the float $L^7$, which, by means of the junction-piece $L^4$, the levers $L^8$ $L^{10}$, and the nipple $L^{14}$, presses the flexible blade $L^{12}$ against the plug $L^3$, and so obtains a hermetic closing of the tube L, even when the petroleum-reservoir II, Fig. 1, is completely open. When the level of the petroleum is lowered in the carbureting-chamber J', the float also descends, drawing with it the levers $L^8$ $L^{10}$, and the nipple $L^{14}$ then ceases to press on the blade $L^{12}$. The combined pressure of the blade $L^{12}$ and the plug $L^3$ on the end of the tube L is such that a small amount of petroleum will ooze out between the end of the tube and the plug when the pressure of petroleum in the reservoir II is sufficient. If, however, the level of the liquid descends too low in the reservoir, the trickling of the petroleum between the tube L and the blade $L^3$ stops, and, owing to the petroleum vaporizing in the carbureting-chamber J', the level thereof descends, and consequently the float $L^7$, which engages the levers and separates the blade $L^{12}$ from the plug $L^3$ by means of the hook $L^{13}$. The tube L is now only closed by the pressure of the said blade $L^3$ and the flow of petroleum between the tube L and the plug $L^3$ recommences or increases.

At the upper end of the carbureting-chamber J' a thick mattress or cushion of cotton or the like is arranged between several divisions formed of metal or the like, with the object of arresting globules of hydrocarbon when there is a strong current of air and for regulating the process of carburization. At the spot where the lower portion of the conical valve $K^2$ enters this mattress a portion at $J^3$ is cut away and a metal lining is provided, so as to prevent the direct passage of carbureted air at the weakest point in the thickness of the mattress. A plug $J^5$, arranged at the base of the carbureter, is used for emptying the apparatus, while a horizontal tube $J^6$, situated at the level which the petroleum should occupy and closed by a screw-plug $J^7$, regulates the level of the petroleum in the said carbureter.

I will now proceed to describe the working of the apparatus taken as a whole. The motor-cylinders I at the supply or feed stroke draw in the carbureted air through the nave F from the hollow part of the crank-shaft B, the box B', the pipe H'', the feed-tube K', and the box K. The said cylinders also take in atmospheric air by the pipe M and the box M', the said air passing either directly into the box K or else reaching the said box after being first heated in the coil $M^3$ $M^7$ and carbureted in the chamber J', or the air may reach this box K' by the two channels at the same time, the degree of carburization being regulated by the relative proportion of volumes of air passing by each channel and by operating the valve $K^2$ by means of the cord $K^6$ on the handle $A^6$, as before described. The air is fed into the chamber J' by the feed-tubes $M^9$ of the pipe $M^8$, which come flush with the surface of the petroleum, the level of the said petroleum being kept constant by the float device already described, and is carbureted by coming in contact with the petroleum, the evaporation of which is hastened, owing to its temperature and its rapid renewal on the said surface. The air on its exit from the chamber J' mixes with the hydrocarbon vapors which have been taken directly to the top of the reservoir II by the tube $l$ and which increase its carburization. The gases from the motor-cylinders, which are at their discharge stroke, are collected by the ring G of the collector IV and are led by the pipes G' and $G^2$ into the spiral $G^3$ $G^7$, where they impart heat to the air for carburization and are finally discharged by the orifice $G^7$ of the said spiral. At the side of the carbureter III the battery V, Fig. 1, is arranged for effecting, together with the transformer VI, the ignition of the explosive mixture in each motor-cylinder. The battery may be of any suitable construction, or when other means for ignition are employed may be altogether dispensed with.

The following is a description of the working of a battery shown for example in Figs. $4^a$, 6, and 10. The said battery is formed of two cylindrical chambers, one being situated within and eccentric to the other and constituting the porous vessel of the said battery, the whole of the battery being capable of rotation around the axis of the outer chamber or casing. The said chambers or casings are formed by two end parts N N', mounted on fixed trunnions $N^2$ $N^3$, carried by the frame of the machine, on which the said parts can turn. Two cylinders are fitted into circular grooves formed in the end parts, one cylinder, $N^4$, forming the outside casing of the battery and the second cylinder, $N^5$, placed inside the first and in a position eccentric thereto. Straps or links $N^6$ keep the end parts N N' fast against the cylinders $N^4$ $N^5$. The cylinder $N^4$ may be formed of porcelain or other like acid-proof material. The second cylinder $N^5$ is formed of an ordinary smooth cylinder for one half of its circumference, but the other half thereof is bent into folds and is formed of enamel or porcelain on the smooth part thereof, but is porous on the other or folded portion. The folded portion of the cylinder $N^5$ is surrounded by a perforated metal plate $N^7$, preferably of copper, which forms contact with the negative pole, as, for example, at $N^{13}$. The zinc element is introduced through the aperture $N^{15}$ into a chamber formed by a portion of the outside cylinder $N^4$ and the perforated cylinder $N^7$, which is turned up at its ends so as to limit the length of the zinc-compartment, which should extend somewhat less than half around the outside cylinder. The existing liquid is introduced by an aperture $N^8$ into the space contained between the two cylinders $N^4$ $N^5$ until the said liquid reaches the level of the aperture, which is then closed in any suitable manner. In the trough parts formed by the folded portion of the cylinder $N^5$ are inserted semicircular carbon plates $N^9$, attached to a horizontal rectangular plate $N^{10}$, which may be strengthened by one or more vertical carbon plates $N^{11}$. The contact is formed on the horizontal carbon plate $N^{10}$ at $N^{12}$. The cylindrical chamber formed by the partially-folded cylinder $N^5$ and the bottom pieces $N$ $N'$ is filled with a depolarizing liquid through an aperture $N^{14}$, which may be closed by a plug. A cord or band $N^{17}$, surrounding the outer casing of the battery, is attached at one of its ends to the strut or link $N^6$, which holds the end pieces together and then passes over a guide-pulley $N^{18}$, Figs. 6, 8, and 11, and from thence passes up vertically through the interior of the gooseneck of the machine $A^3$ and the strut $A^4$, Fig. 3. The upper end of the said cord or band terminates in a thong or knot $N^{19}$ beneath the guiding-handles, where a fork $A^8$ is arranged for retaining, when desired, the knot or thong. By drawing the cord through the fork $A^8$ the battery can be caused to revolve through the desired angle on its axis. The rotation causes the compartment containing the zinc to be plunged into the exciting liquid, which always keeps at the base of the cylinder $N^4$. To vary the strength of the current or to remedy the wear of the zinc elements, the angle of rotation of the battery must be changed so as to increase or diminish the immersion of the zinc element. When the cord is released, the battery will be out of action, as shown in the drawings, being caused to assume this position by a spiral spring fixed at one of its ends to the bottom of the battery and at the other to the frame of the machine, the said spring having been compressed by the previous rotation of the battery.

The battery V is in electrical connection with the transformer VI, and may be formed by a suitable induction-coil. (Not shown in the drawings.) The poles $N^{12}$ $N^{13}$ of the battery are connected, respectively, to the right trunnion $N^2$ by conductors P P', terminating in two metal plates. The conducting-wires $P^2$ $P^3$, leading, respectively, to the two terminals of the induction-coil, likewise terminate at their other ends in metallic plates. The said plates are mounted in pairs on an insulated screw $P^4$ and are insulated by washers of ebonite $P^5$, Figs. $4^a$, 6, and 8, so that the conductor P is connected with $P^2$ and the conductor P' with $P^3$. This mode of connecting up permits of the rotation of the battery without interfering with the conductors. One of the conductors, $P^2$, leads directly along the frame of the machine to the transformer VI. The other conductor, $P^3$, before reaching the transformer, passes to the right guiding-handle $A^6$, where a suitable spring-switch device is arranged, which may be operated by the driver for closing the circuit when it is desired to set the machine in motion.

It has already been stated that a conductor $H^3$ leaves one of the terminals of the circuit of the transformer VI, and by means of a flexible contact $H^5$ and a segmental disk $H^7$ leads the induced current at any desired time to the place of ignition H' in the said cylinders E, the other terminal of the induced circuit being in direct communication with the metal frame of the machine which forms the return-conductor.

For preventing the rider obtaining electric shocks it is preferred to connect in electrical contact in the transformer one of the terminals of the primary current or conductor with a corresponding terminal of the induced current. For example, the two positive terminals may be connected together.

The following completes the description of the operations of this machine and includes the starting, disengaging gear, and the operation of the pedals, as well as the action of the brake. These parts are arranged in a case or sheath extending between the axis of the motor and that of the pedals, Figs. 3, 4, $4^a$, 6, 7, and 8. The pedal-axle O, Figs. 6, 7, and 8, is mounted in a tubular piece O', with rings or straps $O^2$ for adjusting the tubular part when desired and so altering the tension of the endless chain. The said axle terminates at each end in a part of hexagonal or other section for securing the pedals in position. On the hexagonal part to the left, which is formed longer than that to the right, is a toothed wheel $O^3$, shaped to form an open box on one of its faces and containing therein mechanism for operating the motor and the brake. Inside the box $O^3$ is mounted a cylinder $O^4$, loose on the shaft of the toothed wheel $O^3$. Between the cylinder $O^4$ and the circumference of the toothed wheel $O^3$ are arranged two circular recessed or grooved rings, the inner one $O^5$ fitting against the cylinder $O^4$, and the outer one against the circumference of the wheel $O^3$. The recesses or wedges are formed on the two rings so as to come opposite to each other and are kept apart by a series of friction-rollers $O^7$. On turning the axle of the pedals and consequently the toothed wheel $O^3$, which is formed in one therewith, in a forward direction, the space between the wedges formed on the two rings becomes increased and consequently the friction-rollers $O^7$ are not wedged and the inner cylinder $O^4$, which is connected to the engaging gear and the brakes, as will be hereinafter described, is not engaged by the motion of the pedal-axle. If, however, a motion in the opposite direction be imparted to the pedal-axle, the space contained between the wedges on the two rings is diminished and consequently the friction-rollers $O^7$ are held between the wedges, so that the cylinder $O^4$ is engaged in consequence of the interlocking of the parts $O^3$, $O^4$, $O^5$, $O^6$, and $O^7$. The engagement of the cylinder $O^4$, which is obtained by a backward pressure on the pedal-axle, effects simultaneously the disengaging of the motor and the operation of the brake by means of the arrangement which may be described as follows: The cylindrical part $O^4$, Figs. $4^a$ and 8, carries at its base a tailpiece $O^8$, engaging in a notch or recess formed in a toothed sector Q, which is bored out, so that the pedal-axle O is free to pass therethrough. The said sector is fixed on a center of oscillation $Q'$, mounted loose in the front part of a sheath or shield X, which incloses all the mechanism. On the said shaft $Q'$ a small lever $Q^2$ is keyed, which is connected to mechanism operating the engaging gear of the motor. The toothed sector Q, Fig. $4^a$, engages with a toothed rack $Q^3$, arranged on the base of the covering or shield X, and engages at its other extremity with another sector $Q^4$, Figs. 4 and 5, which is formed in one with a double cam $Q^5$. The said sector $Q^4$ and cam $Q^5$ are mounted loose on a washer or ring $Q^6$, forming part of the front face of the rear part of the sheath or covering X and embracing the crank-shaft B. The front face of the said sheath X also carries two guides $Q^7$, Fig. 4, for guiding two engaging parts $Q^8$, in which are formed two holes $Q^{10}$, wherein engage the ends of a double latch $Q^{11}$, keyed on the crank-shaft B, so as to fix the said shaft and consequently cause the motor to be thrown into gear. The engaging parts $Q^8$ are also formed with two lateral recesses or notches $Q^9$, placed opposite each other, in which the ends of the double cam $Q^5$ lodge when the motor is in gear. A spring $Q^{12}$, around the engaging parts $Q^8$, causes the said parts to approach the crank-shaft B.

The disengaging gear is operated in the following manner: When the pedals are turned in a reverse direction, the recessed rings $O^5$ and $O^6$ are wedged together, as shown in Fig. 7, and the cylinder $O^4$ is operated by the toothed wheel $O^3$, and the said cylinder $O^4$ engages in its turn by means of the tailpiece $O^8$ the toothed sector Q, the rack $Q^3$, and the sector $Q^4$, mounted on the crank-shaft B. The double cam $Q^5$, which is fast on the sector $Q^4$, is turned so as to assume the vertical position, as shown in Fig. 4, and so as to free the engaging pieces $Q^8$ from the crank-shaft. The double latch $Q^{11}$ is then freed from the holes or apertures $Q^{10}$, and the crank-shaft is thus released and is loose in the frame of the machine.

To engage the crank-shaft and bring the motor into gear, the following arrangement is employed: The lever $Q^2$, keyed on the rotating axle $Q'$ of the sector Q, Figs. $4^a$ and 7, is connected by means of a cord $Q^{13}$ around a pulley $Q^{14}$ to a rod $Q^{15}$, Figs. 3 and 7, which passes up the gooseneck $A^3$ and the front part $A^4$ of the machine, terminating in a bent part, having at its end a hook $Q^{16}$, which lodges on a plate $Q^{17}$, fixed in the upper part of the sleeve $A^5$, beneath the steering-handles. The left steering-handle $A^7$ carries opposite the hook $Q^{16}$ of the rod $Q^{15}$ a cam $Q^{18}$, which by rotation frees the rod $Q^{15}$ from the plate $Q^{17}$. A spring $Q^{19}$ presses the rod $Q^{15}$ in a downward direction, the lower end of the said spring bearing on a nut fixed at the lower end of the said rod and the upper end of the said spring bearing against a tappet $Q^{20}$, fixed on the frame of the machine.

The engaging of the motor takes place as follows: When the motor has been put out of gear by displacing the toothed sector Q along the rack $Q^3$ in a forward direction, as above described, the arm $Q^2$, which is formed in one with the sector, has by the same movement been displaced in a rearward direction, drawing with it the cord $Q^{13}$, which pulls on the rod $Q^{15}$ and causes the same to rise against the pressure of the spring $Q^{19}$. The hook $Q^{16}$ at the end of the said rod then engages on the plate $Q^{17}$. The several parts retain this position, as shown in the accompanying drawings, as long as the motor is out of gear. To bring the motor into gear, the left guiding-handle $A^7$ is rotated, so as to free the hook $Q^{16}$ by means of cam $Q^{18}$ from the plate $Q^{17}$. Under the influence of the spring $Q^{19}$ the rod $Q^{15}$ is then drawn down and with it the cord $Q^{13}$, which brings the lever forward and in like manner repels the sector Q, the rack $Q^3$, and the sector $Q^4$, Fig. 4, which is formed in one with the double cam $Q^5$. The ends of this cam are thus caused to engage in the lateral notches $Q^9$ of the engaging pieces $Q^8$, which then approach the crank-shaft B and engage in the ends of the double latch $Q^{11}$ as soon as the said ends of the latch $Q^{11}$ are brought opposite the holes $Q^{10}$, formed in the said engaging pieces, by the rotation of the motor. As has already been stated, the action of the brake is effected by the movement of the pedal-axle, which causes the motor to be disengaged.

The brake shown in Figs. 4, 5, and 7 is formed of an open steel ring R, placed in the rear part of the casing X against the rear face thereof. The said ring surrounds a disk $R^3$, formed with a hexagonal opening in the nave thereof, which fits on the left hollow portion $F'$ of the nave F, which is likewise formed hexagonal in section at this part. The disk $R^3$ is formed with a thin periphery, so that it can enter a circular slot formed in the ring R. One of the ends of the said ring ends in a heel-piece $R'$, which bears against a regulating-screw $R^2$, passing through the casing X, which is provided with a tapped hole for this purpose. The other end of the said ring is made fast to a steel band $R^4$, which is directed forwardly along the upper conduit of the sheath X, Figs. 4 and 4ª, ending at its forward extremity in a nose or beak R⁵, bearing against the sector Q.

The brake operates as follows: When the pedal-axis is caused to turn in a backward direction, the sector Q is thrust forward, so as to press against the inner part of the nose R⁵, which is simultaneously pushed forward and upward against the top of the sheath by the front side of the sector Q, so that the rear part swings down and in a forward direction and consequently exerts a tension on the steel band R⁴, which compresses the ring R against the periphery of the disk R³, and the latter being fast on the nave F causes the speed of the motor to be retarded. The locking of the brake is produced whenever a sharp backward pressure is exerted by the feet on the pedals, whether the motor be in gear or not, and when the motor is in gear the aforesaid movement effects the disengaging thereof, as has already been described.

I will now describe the mechanism for propelling the machine by the pedals when the motor is out of gear, the said mechanism also being employed for avoiding the engaging of the pedals by the rotation of the motor when the latter is in gear. To obtain these results, the toothed wheel S³ is mounted on the rotating nave F' in a manner similar to that in which the toothed wheel O³ is mounted on the pedal-axle. The disk R³ has a cylinder S⁴ concentric to the nave of the disk R³, but separated from the latter, so as to leave an annular space between the nave of the disk R³ and the cylinder S⁴. The disk R³, its nave, and the cylinder S⁴ form one piece fast on the part F' of the nave of the motor by means of the hexagonal part above referred to and turns with the latter. In the annular space contained between the nave of the disk R³ and the cylinder S⁴ fits the nave of the toothed wheel S³, forming a box open on one of its faces for containing within transmission mechanism formed by circular wedging parts and cylinder similar to that which has already been described with reference to the pedal-axle, but operating in an opposite direction, as will now be explained. Between the cylinder S⁴ and the circumference of the toothed wheel S³ two circular rings with wedging parts are ranged, the inner one S⁵ being against the cylinder S⁴, and the outer one S⁶ against the inside circumference of the toothed wheel S³. The two series of wedges contained in the circular rings are arranged to face each other, but kept apart by a series of small rollers S⁷. The toothed wheels O³ S³ are geared together by an endless chain $x$ of the usual construction. This arrangement of mechanism operates in the following manner:

The cylinder S⁴ is formed in one with the nave F, and consequently the driving-wheel. The toothed wheel S³ is connected by the endless chain $x$ with the wheel O³, fast on the pedal-axle. Consequently rotation imparted to the said pedal-axle will engage the wheel O³, the endless chain $x$, and the wheel S³. Since the wheel S³ is not keyed on the nave of the driving-wheel the said nave will not be engaged until a wedging takes place between the circular rings S⁵ S⁶ and the cylinders S⁷, which will then cause the whole mechanism to act as one solid piece. The said wedging action only takes place when the speed of the toothed wheel S³ exceeds that of the cylinder S⁴, in which case the wedging part S⁶ advances on the internal wedging part S⁵, and so diminishing the space between the said rings, the friction-rollers are wedged therein. The toothed wheel S³ will then engage the cylinder S⁴ and the driving-wheel. When, however, the speed of the driving-wheel and cylinder S⁴ exceeds that of the toothed wheel S³, the speed of the external wedging-ring S⁶ falls behind that of the internal ring S⁵, thereby increasing the space between the two rings and freeing the small rollers contained between them. The cylinder S⁴ will not now be engaged by the toothed wheel S³ or the toothed wheel O³ of the pedal-axle, which is connected to said wheel S³ by the chain $x$.

When the machine is operated by the pedals, the motor being out of gear, (or what is the same thing, in gear and stopped,) the toothed wheel S³, which is engaged by the toothed wheel O³ of the pedal-axle and the endless chain $x$, will advance in relation to the cylinder S⁴, and consequently the wedging action will be produced and the rear wheel thus engaged by the pedal-axle. The same effect will be produced if the motor is making a slower speed than that imparted to the toothed wheel S³ by the pedal-axle. In this case engagement of the rear wheel will be caused by the pedals, the speed of the wheel S³ being greater than that of the wheel S⁴, producing the wedging action. When, on the other hand, the motor is in gear and operating the cylinder S⁴, which is formed in one with the said motor, will turn without engaging the wheel S³, so that the pedal-axle will never be engaged by the action of the motor when the latter is in operation.

When a rearward movement is imparted to the pedal-axle to bring the motor out of gear and operate the brake, (by means of the wedging of the parts O⁵ O⁶ O⁷, hereinbefore described,) this movement, which is transmitted by the chain $x$ to the wheel S³, has no effect on the cylinder S⁴ of the rear wheel, since the speed of the wheel S³ is slower in relation to that of the wheel S⁴, the normal direction of the movement being always a forward one. Moreover, even when a forward movement is imparted to the pedal-axle, it is without effect on the cylinder S⁴ of the rear wheel whenever the speed of this movement is less than that of the motor.

Having thus described the motor mechanism of a machine constructed according to my invention and its operation, I will proceed to describe the construction of the frame of the said machine, as well as the parts dependent thereon; but I do not limit myself to these precise details of construction.

A shield T, Fig. 11, constructed of angle-iron or the like, is arranged between the front and rear wheels of the machine and contains the electric battery, and also serves as a foot-rest. At the rear of the said shield is the mud-guard constituting the hydrocarbon-reservoir I and the frame for the driving-wheel. A portion of the gooseneck $A^3$ starts from the front part of the shield T and supports the base of the steering-sleeve $A^5$ of the front wheel, the head of which is held firm by a strut $A^4$. Through the said guiding-sleeve $A^5$ passes the steering shaft or axle $A^{10}$, having at its upper end a fork $A^{11}$, to which are connected the handles $A^6$ $A^7$ in such a manner that they can describe an arc of a circle on an axis perpendicular to the plane of the front wheel. The steering-axle $A^{10}$ is fixed at its lower end in the hollow mud-guard $A^{12}$, Figs. 1 and 3, which is fitted with internal partitions and carries firmly attached at the height of the axis of the wheel two steel blades of parabolic form ending in small plates, through which the axle of the rotating wheel passes. The said wheel is strengthened by a flexible fork $A^{14}$, connecting the wheel's axle to a thin plate $A^{15}$, which forms a front prolongation of the mud-guard. In order that the rear part of the machine may have the same elastic properties as the fore part, the frame is carried at the rear on the driving-wheel by means of a fork A, formed by two steel blades of parabolic form, Figs. 1, 4, and 5, fixed to blocks $A^2$ by hoops or collars $A'$, Figs. 4 and 5. At their upper ends the blades A are connected by a cross-piece $A^{16}$, above which is fixed the end of a spiral spring $A^{17}$ and whose other end bears against the lower side of a box $A^{18}$, firmly attached to the mud-guard reservoir I, which forms the rear part of the frame, which thus rests by the spring and box on the top of the said fork A.

The axles of the driving-wheel and pedals are retained fixedly apart on one side by means of the sheath $x$, and on the other by means of the tubes or conduits $H^4$ $H^{11}$, this connection permitting at the same time oscillations of the motor-axle in relation to the frame T and assuring the elasticity of the rear frame. A fork $A^{19}$, jointed at one end to the rear of the sheath $x$ and hooked at its other end to the rear of the mud-guard reservoir I, may be readily unhooked therefrom when desired and turned downward, so as to assume, when the rear wheel of the machine has been raised from the ground, a vertical position, maintaining the said rear wheel raised for enabling cleaning or inspection of mechanism to be readily effected.

On the front part of the shield T or the central portion of the frame a parachute device is arranged for securing the stability of the machine in its vertical position when at a standstill. The said parachute, Figs. 1, $4^a$, 6, 9, and 12, is formed of two bent arms $T'$, arranged symmetrically on either side of the machine and mounted in sleeves $T^2$ on the fore part of the shield T. Round the upper ends of the said bent arms $T'$ is a spiral spring $T^3$, having one end attached to each of the said arms $T'$ and the other end bearing against the frame T, the tendency of the said springs being to constantly keep the arms forward in a position perpendicular to the horizontal plane of the machine. At the upper end of the arms $T'$ a hollowed sector $T^4$ is fixed, furnished with a pin $T^5$, to which the end of the cord $T^6$, of india-rubber or other material, is attached, which passes round the said sector $T^4$ under a guide-pulley $T^7$ and up to each of the steering-handles $A^6$ $A^7$, where its end is fixed in any suitable manner after having passed over the plates $T^8$, projecting above the said guiding-handles $A^6$ $A^7$. The parachute is opened by raising the steering-handles and causing them to describe an arc of a circle round one of the ends of the fork $A^{11}$, to which they are connected. The plates $T^8$ are thus lowered and the cords $T^6$ being loosened permit the arms $T'$ of the parachute to separate from the frame T, thus securing a firm stand for the machine when not in motion. To bring back the arms to their position when out of use, as shown in the drawings, the handles are turned back into their normal position, and the cords stretched by the plates $T^8$ bring the arms $T'$ in position against the frame against the pressure of the springs $T^3$.

I do not limit myself to the precise details of construction shown in the accompanying drawings. For instance, a driving-wheel constructed according to my invention may be applied to any cycle or other vehicle to be driven so as to form one or more wheels of these vehicles, and the motor may be equally well used for operating vessels driven through the sea or through the air, such, for example, as ships or aerial machines.

The felly of the wheel may be fixed in any desired manner to the motor. For example, instead of fixing the said felly against the end of each of the cylinders, it may be fixed to any other part of the said cylinders or to the revolving nave with which the cylinders form one body, or the felly may be mounted on the spokes which are fixed to the nave F of the wheel or around the hollow prolongations of the nave $F'$ or only round one of the said prolongations.

The felly may carry spokes, which instead of being fixed directly on one of the prolongations of the nave may be secured to a sleeve, which may be made fast or loose with the said nave, as desired. In the last-named case by arranging a toothed wheel on the nave and one or more toothed wheels fixed to the central sleeve of the wheel alterations in the speed of the said wheel in relation to the speed of the motor may be obtained which will be found useful in mountainous countries or where bad roads occur. Figs. 16 and 17 show on a small scale one of these arrangements. The part to the left of the motor (shown in outside elevation) remains unchanged. The central part and the cylinders E are likewise shown in elevation. The wheel is mounted and the mechanism for changing the speed are arranged on the right side, which alone is somewhat modified, as shown in Fig. 16. The felly U is mounted on spokes U', slightly bent so as to bring the said felly toward the axis of the wheel. The said spokes are fixed in any suitable manner to a cylinder or cylindrical part $U^2$ on a sleeve $U^3$, having a screw-collar for fixing the cylinder $U^2$, carrying the spokes of the wheel. The sleeve $U^3$ is loose on the extension F' of the nave F, and is provided at its right end with a toothed wheel $U^4$, firmly attached thereto. The cylindrical part carries at its right end a toothed wheel $U^5$, so that by means of the parts $U^2$ $U^3$ the toothed wheels $U^4$ $U^5$ act together. The extension of the nave F' carries at its end a toothed wheel $F^2$ of the same diameter as the wheel $U^4$ and arranged at the side thereof.

The right arm of the fork A of the frame ends in a head-piece $U^6$, carrying on the one hand the sleeve $A^2$ in the interior of which the motor and driving-wheel turn, and also provided with two guiding-pieces $u^6$ in which slides a frame $U^7$, carrying at one of its ends a toothed wheel $U^8$, corresponding in width to that of the two wheels $U^4$ and $F^2$, and at its other end a shaft having two toothed wheels of unequal diameter $U^9$ $U^{10}$. The whole mechanism is mounted in a box $U^{11}$ to protect it from the dust. A rod $U^{12}$, fixed to one of the ends of the sliding frame, passes through the said box and can be operated from the outside in any suitable manner. When the rod $U^{12}$ is drawn, so as to bring the large toothed wheel $U^8$ in gear with the toothed wheels $U^4$ and $F^2$ simultaneously, as shown in Fig. 17, the wheel 8 turns at precisely the same speed as the motor, and the result obtained is the same as if the motor and the wheel were formed in one, as is the case with the machine hereinbefore described. When the rod $U^{12}$ is repulsed in an opposite direction, the wheel $U^8$ ceases to gear with the wheels $U^4$ and $F^2$, but on the other hand the toothed wheels $U^9$ and $U^{10}$ come into gear with the toothed wheels $F^2$ and $U^5$, respectively. The movement of the motor is transmitted to the wheel by this retarding device, and the said wheel turns at a slower speed than the motor, and the force exerted is in this case made greater use of. Any other arrangement of accelerating or retarding gearing may be employed in the place of that I have just described.

What I claim is—

1. A velocipede having a frame provided with a crank-shaft, in combination with a wheel provided with a hollow nave, and radiating fixed cylinders fixed to the said nave, and pistons connected to the crank-shaft, substantially as set forth.

2. In a velocipede, the combination of a frame and crank-shaft, with a wheel provided with one or more motor-cylinders and pistons, the piston-rods being connected to the said crank-shaft, and means for locking the crank-shaft to the frame when the motor is in operation, substantially as set forth.

3. In a velocipede, the combination of a frame and crank-shaft, with a wheel provided with motor-cylinders and pistons, the piston-rods being connected to the said crank-shaft, pedal mechanism, means for locking the crank-shaft to the frame of the velocipede when the motor is in operation, and means for unlocking the same when the velocipede is to be actuated by the pedal mechanism, substantially as set forth.

4. In a velocipede, the combination of a frame and crank-shaft, with a wheel provided with motor-cylinders and pistons, the piston-rods being connected to the said crank-shaft, pedal mechanism and means for automatically locking the pedal mechanism to the motor-wheel when the said pedal mechanism is moving faster than the motor and unlocking the same when the motor moves faster than the pedal mechanism, substantially as set forth.

5. In a velocipede, the combination of a frame and crank-shaft, with a wheel provided with a hollow nave and a series of cylinders radiating therefrom, with pistons, the rods of which are jointed to the crank-shaft, and means for locking the said shaft to the frame of the machine, and unlocking the same, substantially as and for the purposes set forth.

6. In a velocipede, the combination of a frame and crank-shaft, a wheel provided with motor-cylinder and pistons, the piston-rods being jointed to the said crank-shaft, and means for locking the shaft to the frame of the machine with pedal mechanism and a brake, and means actuated by the backward motion of the pedals to unlock the shaft and apply the brake, all substantially as set forth.

7. In velocipedes, the combination of a wheel provided with a hollow nave, cylinders fixed radially to the said nave, admission and exhaust valves on the outside of each cylinder, the admission-valves communicating with the nave by means of exterior pipes and chambers formed in the nave and opening therein, the exhaust-valves in like manner communicating by outside tubes with chambers formed in the nave but leading outside to a fixed gas-collector, the said valves being provided respectively with rods and sliding blocks and two-way cams in which the said sliding blocks work, substantially as described.

8. In velocipedes, the combination of a wheel provided with a hollow nave, cylinders fixed radially to the said nave, admission and exhaust valves on the outside of each cylinder, the admission-valve communicating with the nave by means of exterior pipes and chambers formed in the nave and opening therein, the exhaust-valves in like manner communicating by outside tubes with chambers formed in the nave but leading outside to a fixed gas-collector, the said valves being provided respectively with rods and sliding blocks, springs for keeping the said valves against their seats the said springs being mounted on hollow plugs having spoon-shaped collecting parts for effecting the cooling of the springs and two-way cams in which the said sliding blocks work, substantially as described.

9. In velocipedes, the combination of a wheel provided with a nave, cylinders fixed radially to the said nave, supply and exhaust valves having rods jointed to sliding blocks, with two-way cams in which the sliding blocks work, the cam corresponding to the supply-valve being provided with a sector and means for moving the sector round the axis of the said cam so as to increase when desired the length of the projecting piece of the said cam, substantially as set forth.

10. In velocipedes, the combination of a wheel provided with a nave, cylinders fixed radially to the said nave and pistons for the cylinders, with a crank-shaft capable of being keyed to the frame when desired, one part of the said crank-shaft being hollow for the passage of the explosive mixture, and the central bent part of the said crank-shaft being provided with a sleeve made fast with one of the piston-rods, the other piston-rods being jointed to the said sleeve, substantially as described.

11. In velocipedes, with a self-driven wheel, the combination of the nave, the cylinders, and the crank-shaft with a reservoir for supplying a regulated flow of petroleum, the said reservoir being provided with a tube opening into the nave, and a reservoir for allowing a regulated flow of oil, the said reservoir being provided with a tube opening into a box opposite the hollow part of the crank-shaft, for increasing when desired the carburization of the explosive mixture and efficiently lubricating the internal parts of the motor, substantially as described.

12. In velocipedes with a self-driven wheel, the combination of the nave F, the cylinders E, and the disk $H^7$ of insulating material, mounted on an extension of the nave the said disk being provided with metal segments to which are connected conductors leading to the bottom of each cylinder and terminating in the interior of the same in an insulated metallic part, with a fixed flexible contact $H^5$ placed opposite the segments of the disk $H^7$, the said flexible contact being electrically connected to one of the terminals of any electric transformer or induction-coil VI, the other terminal being connected to the frame of the machine, substantially as set forth.

13. In a velocipede, the combination of a wheel provided with motor-cylinders actuated by explosive material and provided with electric igniting devices, with a reversing electric battery for the electric igniting device, substantially as set forth.

14. In a velocipede, the combination of a wheel provided with motor-cylinders actuated by explosive material and provided with electric igniting devices, with a reversing electric battery for the electric igniting device, the said battery comprising a cylindrical air-tight vessel, inclosing an inner cylindrical porous vessel, bent into folds in its upper part, and inclosing carbons between the said folds, the zinc being in the upper part of the space formed between the two vessels by a perforated part $N^7$ and the exciting liquid occupying when at rest, the lower portion of the said space, the said battery being movable round the axis of the exterior cylindrical vessel with the object of bringing the zinc in contact with the exciting liquid by a half-rotation of the battery, all substantially as described.

15. In velocipedes having a self-driven wheel, the combination of the cylinders E, exhaust-valves $e^2$, tubes $e^3$, exterior to the cylinders, clearing-chambers $e^4$ in the nave, a collector formed by a half-ring with vanes open opposite the orifices of the chambers $e^4$ the said ring having an extension-tube $G'$ and a spiral $G^3$, $G^7$ into which the tube $G'$ opens, with a carbureter having a spiral $M^3$ $M^7$ parallel with the spiral $G^3$, $G^7$, all substantially as set forth.

16. In a velocipede, the combination of a wheel provided with motor-cylinders actuated by explosive material with a carbureter comprising an external box J, an inner carburization-chamber $J'$, a box K, a chamber $M'$ opening to the atmosphere and communicating on the one hand with the box $J'$ and on the other hand with the box K, conduit $H''$ connecting the box K with the motor-wheel and a double-cone valve $K^2$, all substantially as and for the purpose set forth.

17. In a velocipede, the combination of a wheel provided with motor-cylinders actuated by explosive material, a reservoir for the explosive material, the said reservoir forming the mud-guard, and passages leading from the said reservoir to the motor-cylinders, substantially as set forth.

18. In a velocipede, the combination of a wheel provided with motor-cylinders actuated by explosive material, and a hydrocarbon-reservoir forming the mud-guard, with a carbureter, a pipe connection leading from the base of the reservoir to the lower part of the carbureter, a pipe connection from the upper part of the reservoir to the upper part of the carbureter, and means for keeping a constant level of the hydrocarbon in the carbureter, all substantially as and for the purposes set forth.

19. In a velocipede, the combination of the frame and a crank-shaft, a wheel provided with motor-cylinders and pistons, the piston-rods being connected to the said crank-shaft, with means for locking and unlocking the shaft to the frame, the said means comprising the double latch $O^{11}$ fast on the shaft the sliding pieces $O^8$ for engaging the said latch, the double cam $O^5$ and sector $O^4$ in one therewith and rack $Q^3$ adapted to be moved back and forth, all substantially as and for the purposes set forth.

20. In a velocipede, the combination of the frame and a crank-shaft, with a wheel provided with motor-cylinders and pistons, the piston-rods being connected to the said crank-shaft, with pedal mechanism, a brake-strap, mechanism for locking and unlocking the crank-shaft to the frame, and means for actuating the brake and unlocking the crank-shaft, the said means comprising a sector Q bored for the free passage of the pedal-axle and provided with a notch, the said sector being capable of moving round the axis of oscillation and provided with an arm $Q^2$, an engaging-rod $Q^{15}$, connected to the arm, the said rod being provided with a spring, a free cylindrical part $O^4$ provided with a tailpiece entering the notch of the sector Q, a toothed wheel $O^3$ keyed on the pedal-axle and constituting an open box for receiving the cylindrical part $O^4$, and wedges $O^5$, $O^6$, friction-rollers $O^7$ between the wedges, and a band $R^4$ having at its forward end a bent nose $R^5$ bearing on the sector Q, substantially as set forth.

21. In velocipedes, operated at will, by a motor or by pedal, the combination of the nave of the driving-wheel, a cylindrical part keyed on the said wheel, a toothed wheel loose on the nave and forming a box for containing the said cylindrical part, and two sets of wedges on rings between which are friction-rollers, with a toothed wheel keyed on the pedal-axle, and an endless chain connecting the latter to the toothed wheel loose on the nave of the driving-wheel, whereby the driving-wheel is propelled by the movement of the pedal-axle without the pedal being propelled by the movement of the driving-wheel, substantially as described.

22. A velocipede having a frame provided with a crank-shaft, in combination with a wheel provided with a hollow nave, and an uneven number of radiating cylinders fixed to the said nave, and pistons connected to the crank-shaft, substantially as set forth.

23. In a velocipede, the combination of a frame and a crank-shaft, with a wheel provided with motor-cylinders and pistons, the piston-rods being connected to the crank-shaft, with gearing on the crank-shaft and on the frame of the wheel and a sliding frame carrying differential gears to mesh with and connect the crank-shaft to the frame of the wheel whereby change in speed of the wheel is obtained, substantially as set forth.

In testimony whereof I have signed my name to this specification in the presence of two subscribing witnesses.

FELIX THÉODORE MILLET.

Witnesses:
CHARLES DOUY,
CLYDE SHROPSHIRE.